J. WALLACE.
Distilling-Apparatus.
No. 199,006.  Patented Jan. 8, 1878.
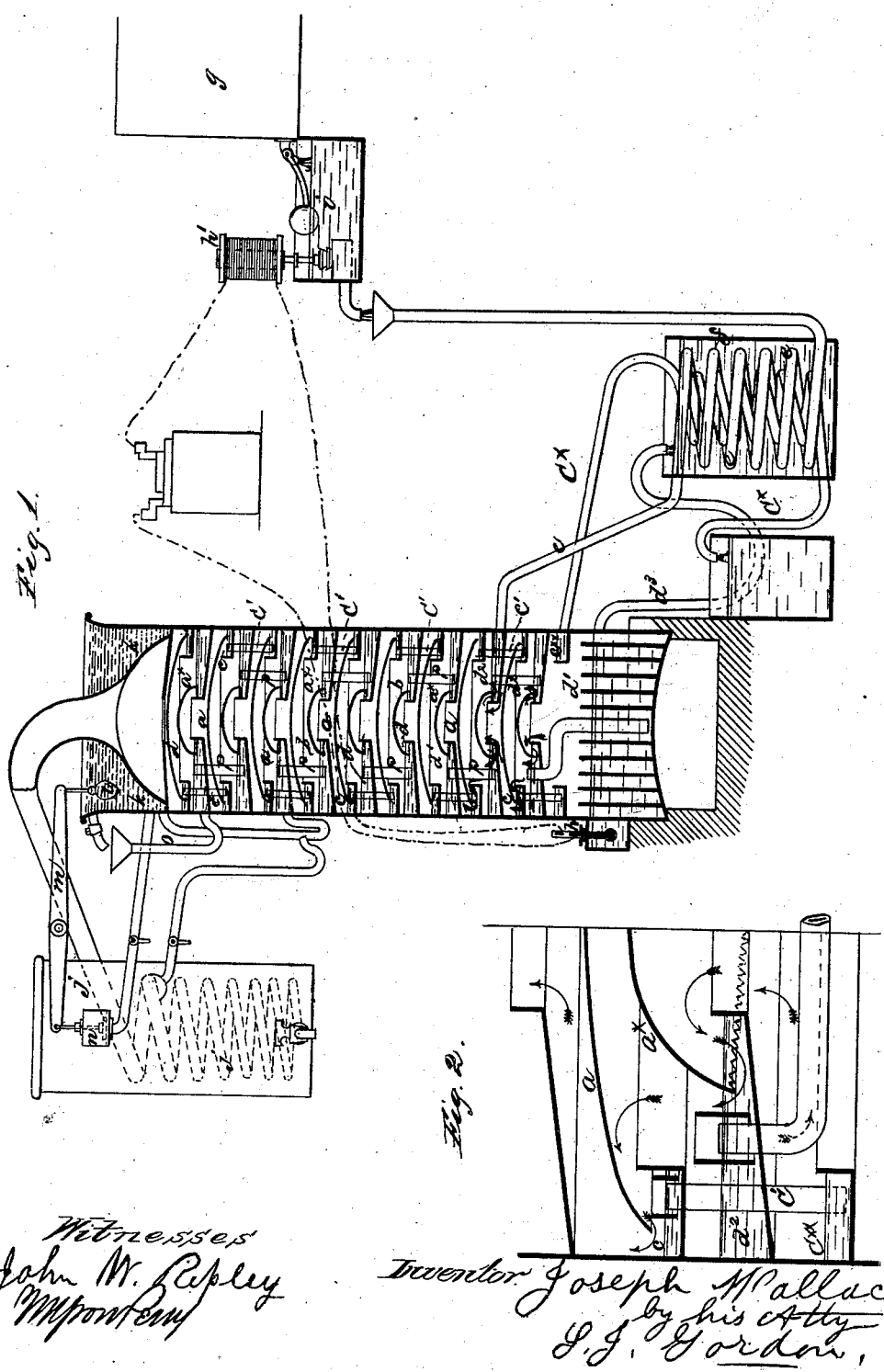

UNITED STATES PATENT OFFICE.

JOSEPH WALLACE, OF BELFAST, IRELAND, ASSIGNOR TO INSLEE A. HOPPER, OF NEWARK, AND THOMAS BARBOUR, OF PATERSON, NEW JERSEY.

IMPROVEMENT IN DISTILLING APPARATUS.

Specification forming part of Letters Patent No. 199,006, dated January 8, 1878; application filed July 26, 1877; patented in England April 28, 1873.

*To all whom it may concern:*

Be it known that I, JOSEPH WALLACE, of Belfast, Ireland, Kingdom of Great Britain, have invented a new and useful Apparatus for Distilling, which is fully set forth in the following specification and accompanying drawings, in which—

Figure 1 is a sectional elevation of my improved apparatus; Fig. 2, a sectional view of the lower part of the still.

The object of my invention is to remove from alcohol or prevent the admixture therewith of the fusel-oil, acetic acid, and other impurities distilled over with the spirits—an object heretofore imperfectly obtained by repeated dilutions with water and frequent rectifications or redistillations at considerable expense for firing and losses by evaporation, and a percentage of alcohol passing off in the spent wash.

By my improved apparatus a spirit of superior quality, free from the peculiar taste and smell heretofore removed by "aging," is produced at a single operation. I have discovered that if a spirituous vapor containing fusel-oil, even though previously freed from acetic acid, is passed through my apparatus in contact with an extensive metallic surface the fusel-oil will be condensed thereon, and may be readily conducted out of the apparatus, while the pure spirit passes over to the refrigerator, fusel-oil being held merely in mechanical suspension in hot alcohol. To effect this, I employ a number of surface-plates, $a$ $a$, or inverted concave dishes arranged in a series of compartments, $b$ $b$, in the still, so that any deposit condensed on the under surface will run into separate channels $c$ $c$, communicating with those immediately below by drop-tubes $c'$ $c'$, whereby the impure liquid will flow from one channel to another until it reaches the lowest channel $c^{\times \times}$, whence pipe $c^\times$ conducts it out of the apparatus.

Boiler $d^1$ is constructed in the ordinary manner to heat by fire or steam, as may be preferred. The cooling-liquid in refrigerator $j$ is water. The supply of liquid for chamber $k$ on top of the still comes from the refrigerator. Boilers $d^2$ $d^2$ are the last two of channel $d$.

To remove the acetic acid, another set of dish-shaped surface-condensers, $a^\times$ $a^\times$, are used. Their edges are serrated, and dip into a solution of bicarbonate of soda or other suitable alkali, contained in channels $d$ $d$. The acetic acid is thus made to combine with the alkaline carbonate, and as the alcoholic vapor rises in the still, and passes through the alkaline solution in a series of the channels, its impurities are removed, and a finished spirit produced equal to that which has been kept several years in wood.

The purifying continues from the very beginning of the process until near the end. The small modicum of "faints" remaining in the liquid may be entirely removed by mixing the impure liquid with the wash in the next operation.

I employ three wash-boilers, $d^1$ $d^2$ $d^2$, and cause the cold wash to pass from reservoir $g$ slowly through coil $e$ immersed in the boiling spent wash, which is discharged from the still through pipe $d^3$ into a vessel, $f$, outside. In this way the heat of the spent wash is utilized and transmitted to the new wash in vessel $f$. The wash in coil $e$ then runs hot into the third boiler $d^2$ in a continuous stream, as the overflow spent wash runs out of the lowest boiler $d^1$ through siphon-tube $d^3$ into vessel $f$.

The boiling of the wash may be effected by a fire beneath the still, or by steam applied directly, or by high-pressure steam surrounding the bottom, or by passing steam through a coil of pipes immersed in the lowest wash-boiler, $d^1$. The hot alcoholic vapors ascending from boiler $d^1$ pass under the serrated edge of the inverted dish-shaped plates $a^\times$ $a^\times$ and cause the wash to boil in boiler $d^2$, and so on through the column.

To prevent any spent wash from passing out when not thoroughly exhausted of its alcohol, I attach a thermometer, $h$, provided with an electric arrangement connected with a magnet, $h'$, which is arranged to actuate the valve in the supply-cistern $i$ of the wash-reservoir, and by so doing allows the wash to run continuously from the cistern $i$ of the reservoir into the coil $e$, and thence into the third boiler $d^2$, so long as the wash that passes out of the lowest boiler $d^1$ shows thorough exhaustion by indicating a temperature of 212° Fahrenheit. As soon, however, as the boiling-temperature sinks below that degree it will indicate that there is a shade of alcohol in the wash, and as the mercury in the thermometer $h$ will fall electrical contact will be broken with the magnet $h'$, and the wash-valve in the cistern $i$ will be closed, and cut off the supply of wash until the thorough exhaustion of the wash in the boiler $d^1$ is accomplished, when the temperature will then rise and produce metallic contact in the thermometer $h$, when the valve in the cistern $i$ will open again. In this way the wash-exhaustion arrangement will be perfectly automatic and independent of skilled labor or attention on the part of the attendants.

After the alcoholic vapor leaves the third wash-boiler $d^2$ it passes upward and under the serrated edges of the dishes $a^\times\ a^\times$, bubbles up through the solution of bicarbonate of soda or other alkali contained in the compartments $d\ d$, and deposits a portion of its fusel-oil on the surface-condensers $a\ a$, and then passes into the next chamber above, also containing a solution of bicarbonate, and so on alternately until it reaches the refrigerator $j$, where it is finally condensed into finished spirit.

To make the alcohol of any given uniform strength, the capital of the still is surrounded with water or a solution of bicarbonate of soda in water, as shown at $k$, Fig. 1, and immersed in it is a large hydrometer, $l$, weighted to the required degree, and attached to the long arm of lever $m$, which acts on a delicate valve, $n$, in the refrigerator. This hydrometer sinks in the water or solution surrounding the head of the still on the least augmentation of a certain and determined degree of heat, and allows just sufficient of the colder fluid to come in to float the bulb $l$, and thereby close valve $n$. By this means the finished alcohol flows over with the greatest uniformity of strength. One hundred and sixty-five to one hundred and seventy degrees are the best heats for surrounding the capital of the still to produce alcohol 55° to 66° over proof.

The heated alkaline solution is allowed to overflow from still-head $k$ through siphon-pipe $o$ into the top compartment, where it is carried slowly round an annular ring, into which the serrated edges of one of the inverted saucer-shaped dishes $a^\times$ dips. It flows all around the compartment, and then passes downward through dripping-tube $p$ into the next chamber, and so on until it reaches the wash-boilers, and finally passes off with the spent wash. Thus, all alcohols can be finished as aged or matured spirit from the first of the run to the last, yet retaining their bouquet, "grip" or relish to the fullest extent.

It will be seen from the foregoing that, for rectification, this still is superior to all others, inasmuch as the whole of the alcohol used can be utilized for finished gin or other cordial of superior quality, and will not, as at present, consist of a harsh, coarse, crude, raw spirit, of which quality, even only seventy-five per cent. is fit for consumption.

What I claim as my invention, and desire to secure by Letters Patent, is—

The combination of the described secondary series of inverted dishes or condensing-plates $a\ a$, arranged not to dip within the liquid, channels $c\ c$, and pipes to conduct the fusel-oil out of the apparatus, constructed and operating together substantially as described, to prevent the condensed fusel-oil from passing, with the vapor, through the column.

JOSEPH WALLACE.

Witnesses:
WILLIAM SYMONS CROSSE,
STEPHEN O. TYNG, Jr.